United States Patent [19]

Shimizu et al.

[11] Patent Number: 5,551,408
[45] Date of Patent: Sep. 3, 1996

[54] EXHAUST GAS RECIRCULATION CONTROL SYSTEM FOR INTERNAL COMBUSTION ENGINES

[75] Inventors: Daisuke Shimizu; Kotaro Miyashita; Yoshihisa Hara; Hiroshi Ikeba, all of Wako, Japan

[73] Assignee: Honda Giken Kogyo K.K. (Honda Motor Co., Ltd, in English), Tokyo, Japan

[21] Appl. No.: 322,193

[22] Filed: Oct. 12, 1994

[30] Foreign Application Priority Data

Oct. 19, 1993 [JP] Japan .................................. 5-284368

[51] Int. Cl.⁶ .................................................. F02M 25/07
[52] U.S. Cl. ................................................................ 123/571
[58] Field of Search .............................................. 123/571

[56] References Cited

U.S. PATENT DOCUMENTS

| | | | |
|---|---|---|---|
| 4,471,745 | 9/1984 | Yoshioka et al. | 123/571 |
| 4,665,882 | 5/1987 | Otobe | 123/571 |
| 4,669,442 | 6/1987 | Nakamura et al. | 123/571 |
| 5,172,550 | 12/1992 | Takeshima | 123/571 |
| 5,209,214 | 5/1993 | Ikuta et al. | 123/571 |

*Primary Examiner*—David A. Okonsky
*Attorney, Agent, or Firm*—Arthur L. Lessler

[57] ABSTRACT

An exhaust gas recirculation control system for an internal combustion engine includes an exhaust gas recirculation passage extending between the intake system of the engine and the exhaust system thereof, and an exhaust gas recirculation control valve for controlling the flow rate of exhaust gases to be recirculated through the exhaust gas recirculation passage. The system further includes an ECU which calculates a desired air-fuel ratio of a mixture supplied to the engine, based on engine operating conditions detected by engine operating parameter sensors, and also a desired valve opening of the exhaust gas recirculation control valve, based on engine operating conditions detected by the operating parameter sensors and the calculated desired air-fuel ratio. The ECU modifies the calculated desired valve opening by a first predetermined amount, and starts the controlling of the flow rate of exhaust gases to be recirculated by the exhaust gas recirculation control valve, by the use of the modified desired valve opening, when it is determined that the desired air-fuel ratio has been changed from a lean state to a rich state or vice versa.

7 Claims, 4 Drawing Sheets

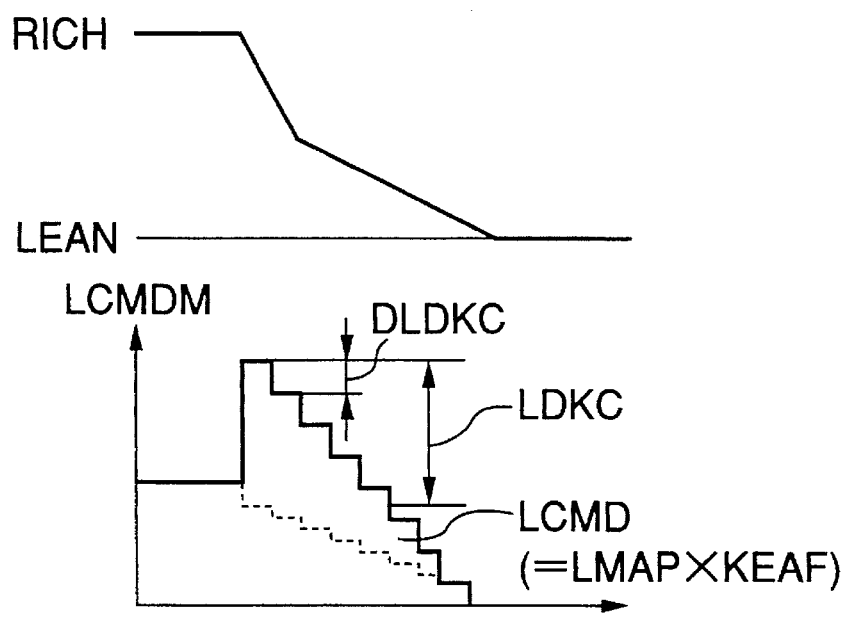
FIG.4A
FIG.4B
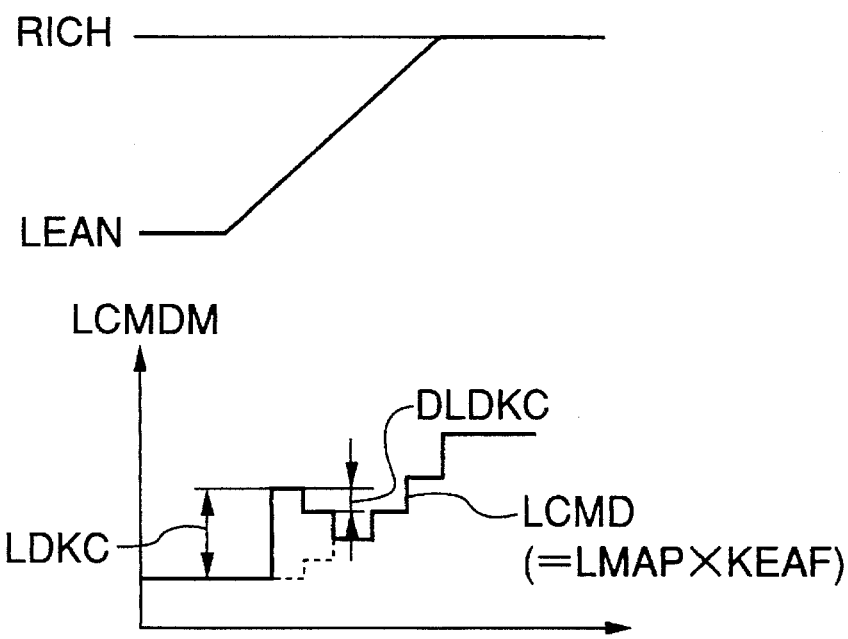
FIG.5A
FIG.5B

EXHAUST GAS RECIRCULATION CONTROL SYSTEM FOR INTERNAL COMBUSTION ENGINES

BACKGROUND OF THE INVENTION

1. Field of the Invention

This invention relates to an exhaust gas recirculation control system for internal combustion engines, and more particularly to an exhaust gas recirculation control system which recirculates part of exhaust gases emitted from the engine to the intake system thereof, to thereby decrease emission of noxious components in the exhaust gases, such as NOx.

2. Prior Art

Conventionally, there has been proposed a method of controlling exhaust gas recirculation, for example, by Japanese Provisional Patent Publication (Kokai) No. 60-173361, which method comprises providing an exhaust gas recirculation passage for recirculating part of exhaust gases emitted from an internal combustion engine to the intake system thereof, and an exhaust gas recirculation valve for controlling the flow rate of exhaust gases to be recirculated through the exhaust gas recirculation passage, and calculating a desired amount of exhaust gases to be recirculated in response to the air-fuel ratio of a mixture supplied to the engine, to thereby control the exhaust gas recirculation valve, based on the calculated desired amount of exhaust gases to be recirculated.

The above conventional method, however, has the following inconvenience: For example, when the air-fuel ratio of the mixture has been changed from a rich state to a lean state, NOx is emitted in large amounts. To reduce the emission of NOx, a large amount of exhaust gases should be supplied by recirculation to the engine. However, the method does not contemplate a so-called "dynamic delay" of exhaust gases to be recirculated, which is a time lag from the time the amount of exhaust gases to be recirculated is calculated to the time the calculated amount of exhaust gases is actually supplied to the engine. Therefore, the desired amount of exhaust gases to be recirculated is not supplied to the engine immediately after the above change in the air-fuel ratio, resulting in failure to reduce the amount of NOx to a satisfactory degree immediately after the change.

SUMMARY OF THE INVENTION

It is the object of the invention to provide an exhaust gas recirculation control system for internal combustion engines, which is capable of restraining emission of noxious components such as NOx to amounts as small as possible, even immediately after a change in the air-fuel ratio of the mixture from a lean state to a rich state or vice versa.

To attain the above object, the present invention provides an exhaust gas recirculation control system for an internal combustion engine having an intake system, and an exhaust system, including an exhaust gas recirculation passage extending between the intake system and the exhaust system, for recirculating part of exhaust gases emitted from the engine, an exhaust gas recirculation control valve for controlling a flow rate of exhaust gases to be recirculated through the exhaust gas recirculation passage, engine operating condition-detecting means for detecting operating conditions including rotational speed of the engine and load on the engine, desired air-fuel ratio-calculating means for calculating a desired air-fuel ratio of a mixture supplied to the engine, based on operating conditions of the engine detected by the operating condition-detecting means, and desired valve opening-calculating means for calculating a desired valve opening of the exhaust gas recirculation control valve, based on operating conditions of the engine detected by the operating condition-detecting means and the desired air-fuel ratio calculated by the desired air-fuel ratio-calculating means.

The exhaust recirculation control system according to the invention is characterized by comprising:

determining means for determining whether the desired air-fuel ratio of the mixture has been changed from a lean state to a rich state or vice versa, based on the desired air-fuel ratio calculated by the desired air-fuel ratio-calculating means;

valve opening-modifying means for modifying the desired valve opening of the exhaust gas recirculation control valve calculated by the desired valve opening-calculating means, by a first predetermined amount; and valve opening control means for starting the controlling of the flow rate of exhaust gases to be recirculated by the exhaust gas recirculation control valve, by the use of the modified desired valve opening, when it is determined by the determining means that the desired air-fuel ratio of the mixture has been changed from the lean state to the rich state or vice versa.

Preferably, the desired valve opening-calculating means comprises basic valve opening-calculating means for calculating a basic value of the desired valve opening, based on operating conditions of the engine detected by the operating condition-detecting means, and correction means for correcting the basic value of the desired valve opening calculated by the basic valve opening-calculating means, based on operating conditions of the engine detected by the operating condition-detecting means and the desired air-fuel ratio of the mixture calculated by the desired air-fuel ratio calculating means.

Further preferably, the valve opening-modifying means calculates the first predetermined amount by multiplying the basic value of the desired valve opening by a first predetermined coefficient.

Also preferably, the first predetermined coefficient is set to a first value when it is determined by the determining means that the desired air-fuel ratio of the mixture has been changed from the lean state to the rich state, and to a second value when it is determined by the determining means that the desired air-fuel ratio of the mixture has been changed from the rich state to the lean state.

More preferably, the valve opening-modifying means includes adding means for adding the first predetermined amount to the desired valve opening to modify the desired valve opening.

Advantageously, the valve opening-modifying means further includes subtracting means for successively subtracting a second predetermined amount from the first predetermined amount.

Further preferably, the valve opening-modifying means calculates the second predetermined amount by multiplying the basic value of the desired valve opening by a second predetermined coefficient.

Also preferably, the second predetermined coefficient is set to a first value when it is determined by the determining means that the desired air-fuel ratio of the mixture has been changed from the lean state to the rich state, and to a second value when it is determined by the determining means that the desired air-fuel ratio of the mixture has been changed from the rich state to the lean state.

The above and other objects, features, and advantages of the invention will be more apparent from the following detailed description taken in conjunction with the accompanying drawings.

BRIEF DESCRIPTION OF THE DRAWINGS

FIGS. 4A and 4B collectively form a timing chart showing a change in the modified desired valve opening value LCMDM when the air-fuel ratio of the mixture is changed from a rich state to a lean state, in which:

FIG. 4A shows a change in the air-fuel ratio of the mixture from the rich state to the lean state: and FIG. 4B shows a change in the value of the modified desired valve opening value LCMDM with the lapse of time; and FIGS. 5A and 5B collectively form a timing chart showing a change in the modified desired valve opening value LCMDM when the air-fuel ratio of the mixture is changed from a lean state to a rich state, in which:

FIG. 5A shows a change in the air-fuel ratio of the mixture from the lean state to the rich state; and FIG. 5B shows a change in the value of the modified desired valve opening value LCMDM with the lapse of time.

DETAILED DESCRIPTION

The invention will now be described in detail with reference to the drawings showing an embodiment thereof.

Figure 1:
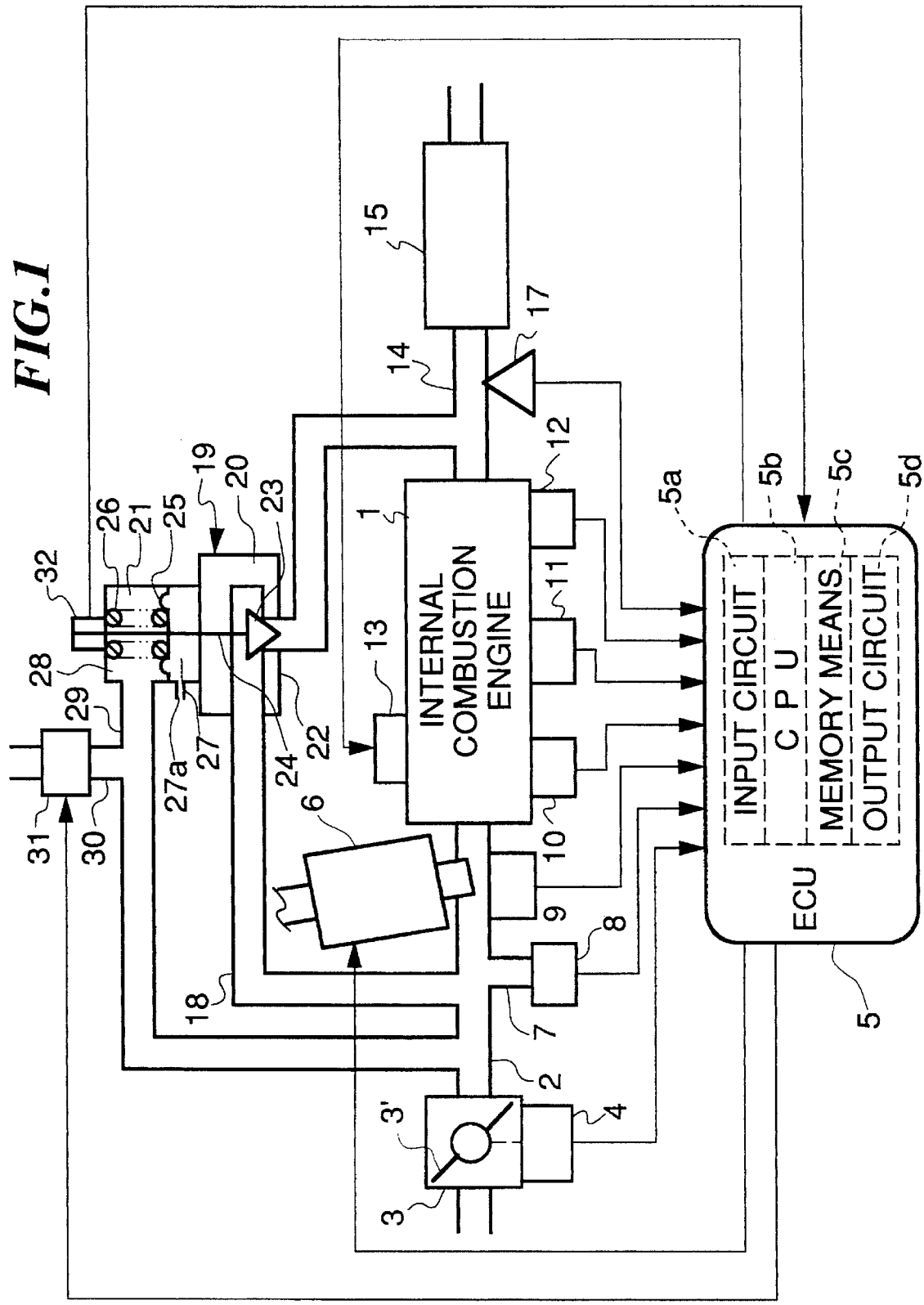
FIG. 1 is a block diagram schematically showing the whole arrangement of an internal combustion engine and an exhaust gas recirculation control system therefor, according to an embodiment of the invention.

Referring first to FIG. 1, there is illustrated the whole arrangement of an internal combustion engine and an exhaust gas recirculation control system therefor, according to an embodiment of the invention.

In the figure, reference numeral 1 designates a DOHC straight type four-cylinder internal combustion engine (hereinafter simply referred to as "the engine"), each cylinder being provided with a pair of intake valves and a pair of exhaust valves, not shown. In an intake pipe 2 of the engine 1, there is arranged a throttle body 3 accommodating a throttle valve 3' therein. A throttle valve opening (θTH) sensor 4 is connected to the throttle valve 3' for generating an electric signal indicative of the sensed throttle valve opening and supplying the same to an electronic control unit (hereinafter referred to as "the ECU") 5.

Fuel injection valves 6, only one of which is shown, are inserted into the interior of the intake pipe 2 at locations intermediate between the cylinder block of the engine 1 and the throttle valve 3' and slightly upstream of respective intake valves, not shown. The fuel injection valves 6 are connected to a fuel pump, not shown, and electrically connected to the ECU 5 to have their valve opening periods controlled by signals therefrom.

An intake pipe absolute pressure (PBA) sensor 8 is provided in communication with the interior of the intake pipe 2 via a conduit 7 opening into the intake pipe 2 at a location downstream of the throttle valve 3', for supplying an electric signal indicative of the sensed absolute pressure PBA within the intake pipe 2 to the ECU 5.

An intake air temperature (TA) sensor 9 is mounted in the wall of the intake pipe 2 at a location downstream of the conduit 7, for supplying an electric signal indicative of the sensed intake air temperature TA to the ECU 5.

An engine coolant temperature (TW) sensor 10 formed of a thermistor or the like is inserted into a coolant passage filled with a coolant and formed in the cylinder block, for supplying an electric signal indicative of the sensed engine coolant temperature TW to the ECU 5.

Further, an engine rotational speed (NE) sensor 11 and a cylinder discriminating (CYL) sensor 12 are arranged in facing relation to a camshaft or a crankshaft of the engine 1, neither of which is shown. The NE sensor 11 generates a pulse as a TDC signal pulse at each of predetermined crank angles whenever the crankshaft rotates through 180 degrees, while the CYL sensor 12 generates a pulse as a CYL signal pulse at a predetermined crank angle of a particular cylinder of the engine, both of the pulses being supplied to the ECU 5.

Each cylinder of the engine has a spark plug 13 electrically connected to the ECU 5 to have its ignition timing controlled by a signal therefrom.

A catalytic converter (three-way catalyst) 15 is arranged in an exhaust pipe 14 extending from the cylinder block of the engine 1, for purifying noxious components present in the exhaust gases, such as HC, CO, and NOx.

Further, a linear output air-fuel ratio sensor (hereinafter referred to as "the LAF sensor") 17 is arranged in the exhaust pipe 14 at a location upstream of the catalytic converter 15, for supplying an electric signal having a voltage level substantially proportional to the sensed concentration of the exhaust gases, to the ECU 5.

An exhaust gas recirculation passage 18 extends between the intake pipe 2 and the exhaust pipe 14 such that it bypasses the cylinder block of the engine 1. The exhaust gas recirculation passage 18 has one end thereof connected to the interior of the exhaust pipe 14 at a location upstream of the LAF sensor 17 (i.e. on the engine side of the same), and the other end thereof connected to the interior of the intake pipe 2 at a location upstream of the PBA sensor 8.

An exhaust gas recirculation control valve (hereinafter referred to as "the EGR valve") 19 is arranged across an intermediate portion of the exhaust gas recirculation passage 18. The EGR valve 19 is comprised of a casing 22 having a valve chamber 20 and a diaphragm chamber 21 defined therein, a wedge-shaped valve element 23 arranged within the valve chamber 20 for vertical movement to open and close the exhaust gas recirculation passage 18, a diaphragm 25 connected to the valve element 23 via a valve stem 24, and a spring 26 urging the diaphragm 25 in the valve-closing direction. Further, the diaphragm chamber 21 has an atmospheric pressure chamber 27 on the lower side thereof and a negative pressure chamber 28 on the upper side thereof defined by the diaphragm 25.

The atmospheric pressure chamber 27 communicates with the atmosphere via a venthole 27a, while the negative pressure chamber 28 is connected to one end of a negative pressure communication passage 29. Specifically, the negative pressure communication passage 29 has the other end thereof connected to the interior of the intake pipe 2 at a location between the throttle valve 3' and the other end of the exhaust gas recirculation passage 18, for guiding the absolute pressure PBA within the intake pipe 2 to the negative pressure chamber 28. An atmosphere communication passage 30 is connected to an intermediate portion of the negative pressure communication passage 29, and a pressure control valve 31 is arranged across the atmosphere communication passage 30. The pressure control valve 31 is formed of a normally-open electromagnetic valve for selectively causing atmospheric pressure or negative pressure to be supplied into the negative pressure chamber 28 of the diaphragm chamber 21 so as to adjust pressure (control pressure) within the negative pressure chamber 28 in the following manner:

If the pressure control valve 31 is energized to be closed, the negative pressure within the negative pressure chamber 28 increases, i.e. the force acting upon the diaphragm 25 increases, so that the diaphragm 25 moves upward against the urging force of the spring 26 to thereby increase the valve opening (lift) of the EGR valve 19. On the other hand, if the pressure control valve 31 is deenergized to be opened, the negative pressure within the negative pressure chamber 28 decreases, so that the diaphragm 25 moves downward by the urging force of the spring 26 to thereby decrease the valve opening (lift) of the EGR valve 19. In this manner, the valve opening of the EGR valve 19 is controlled by energizing or deenergizing the pressure control valve 31. The pressure control valve 31 is electrically connected to the ECU 5 to be controlled by a command signal therefrom to carry out the above-mentioned lift control operation of the valve element 23 of the EGR valve 19.

Further, the EGR valve 19 is provided with a valve opening (lift) sensor (hereinafter referred to as "the L sensor") 32 for detecting the operating position (valve lift) of the valve element 23, and a signal indicative of the sensed valve lift is supplied from the L sensor 32 to the ECU 5.

The ECU 5 is comprised of an input circuit 5a having the functions of shaping the waveforms of input signals from various sensors as mentioned above, shifting the voltage levels of sensor output signals to a predetermined level, converting analog signals from analog-output sensors to digital signals, and so forth, a central processing unit (hereinafter referred to as "the CPU") 5b, memory means 5c formed of a ROM storing various operational programs which are executed by the CPU 5b, and various maps and tables, referred to hereinafter, and a RAM for storing results of calculations therefrom, etc., and an output circuit 5d which outputs driving signals to the fuel injection valves 6, spark plug 13, pressure control valve 31, etc.

The CPU 5b operates in response to the above-mentioned signals from the sensors to determine operating conditions in which the engine 1 is operating, such as an air-fuel ratio feedback control region in which air-fuel ratio control is carried out in response to oxygen concentration in exhaust gases, and open-loop control regions, and calculates, based upon the determined engine operating conditions, a valve opening period or fuel injection period TOUT over which the fuel injection valves 6 are to be opened in synchronism with generation of TDC signal pulses, by the use of the following equation (1). Results of the calculation are stored into the RAM of the memory means 5c:

$$TOUT = TiM \times KCMDM \times KLAF \times K1 + K2 \qquad (1)$$

where TiM represents a basic value of the fuel injection period TOUT, which is determined according to engine operating parameters, such as the engine rotational speed NE and the intake pipe absolute pressure PBA. A TiM map is stored in the ROM of the memory means 5c for determining the TiM value.

KCMDM represents a modified desired air-fuel ratio coefficient, which is obtained by multiplying a desired air-fuel ratio coefficient KCMD by a fuel cooling-dependent correction coefficient KETV. The fuel cooling-dependent correction coefficient KETV is for correcting the fuel injection amount to compensate for a change in the intake air amount, which is caused by a cooling effect due to actual fuel injection. The KETV value is determined in response to the desired air-fuel ratio coefficient KCMD.

KLAF represents an air-fuel ratio correction coefficient which is set to a value such that the air-fuel ratio detected by the LAF sensor 17 becomes equal to a desired value when the engine 1 is operating in the air-fuel ratio feedback control region, while it is set to predetermined values corresponding to the respective open-loop control regions of the engine when the engine 1 is in the open-loop control regions.

K1 and K2 represent other correction coefficients and correction variables, respectively, which are set according to engine operating parameters to such values as optimize engine operating characteristics, such as fuel consumption and engine accelerability.

Figure 2:
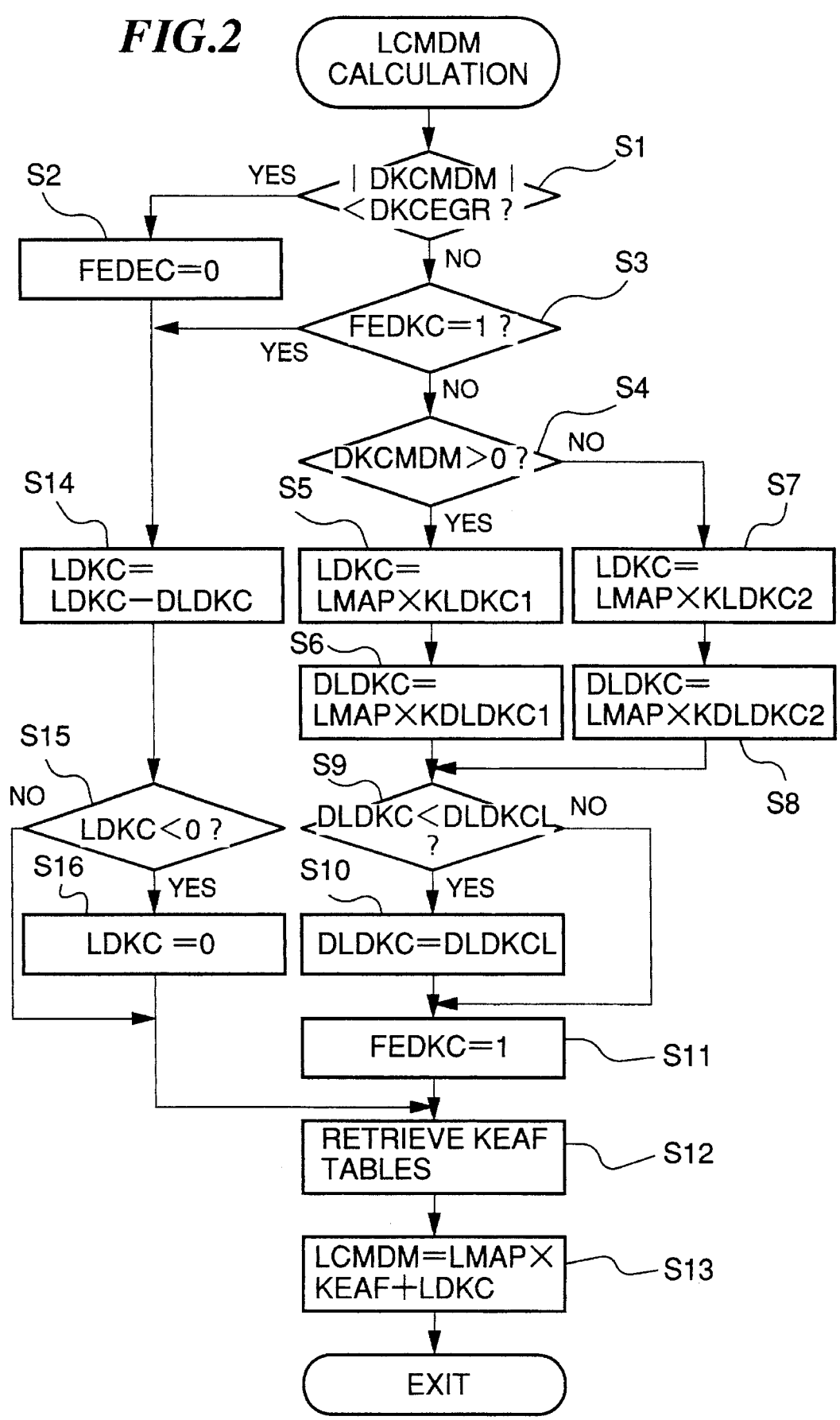
FIG. 2 is a flowchart showing a program for calculating a modified desired valve opening value LCMDM.

FIG. 2 shows a program for calculating a modified desired valve opening value LCMDM which is used in carrying out exhaust gas recirculation control. This program is executed in synchronism with generation of TDC signal pulses. A lean/rich change-determining flag FEDKC, referred to hereinafter, which is used in this program, is set to "0" if the engine is not operating in a predetermined exhaust gas recirculation region.

At a step S1, it is determined whether or not an absolute difference |DKCMDM| between a present value KCMDM (n) of the modified desired air-fuel ratio coefficient and a last value KCMDM (n−1) of the same is smaller than a predetermined value DKCEGR, to thereby determine whether the desired air-fuel ratio of the mixture has been changed from a rich state to a lean state or vice versa. If it is determined that the absolute difference |DKCMDM| is smaller than the predetermined value DKCEGR, which means that the desired air-fuel ratio of the mixture has not been changed, the program proceeds to a step S2, wherein the flag FEDK is set to "0", followed by the program proceeding to a step S14.

On the other hand, if it is determined at the step S1 that the absolute difference |DKCMDM| is larger than the predetermined value DKCEGR, which means that the desired air-fuel ratio of the mixture has been changed either from a rich state to a lean state or from a lean state to a rich state, the program proceeds to a step S3, wherein it is determined whether or not the flag FEDKC is set to "1" Immediately after the change in the desired air-fuel ratio, the flag FEDKC remains set to "0", and therefore the answer of the step S3 is negative (NO), followed by the program proceeding to a step S4.

At the step S4, it is determined whether or not the difference DKCMDM between the present value KCMDM (n) of the modified desired air-fuel ratio coefficient and the last value KCMDM (n−1) of the same is larger than "0". If the answer to the question at the step S4 is affirmative (YES), it is determined that the desired air-fuel ratio of the mixture has been changed from a lean state to a rich state, and then the program proceeds to a step S5, wherein a first predetermined amount LDKC is calculated by the use of the following equation (2):

$$LDKC = LMAP \times KLDKC1 \quad (2)$$

where LMAP represents a basic valve opening of the EGR valve 19, which is determined in accordance with the engine rotational speed NE and the intake pipe absolute pressure PBA. An LMAP map is stored in the ROM of the memory means 5c, for determining the LMAP value.

KLDKC1 represents a first predetermined coefficient, which is applied when the desired air-fuel ratio of the mixture has been changed from a lean state to a rich state and set to such a predetermined value as compensate for a dynamic delay of exhaust gases to be recirculated when the desired air-fuel ratio of the mixture has been changed from the lean state to the rich state. The first predetermined coefficient KLDKC1 may be set to a fixed value, or to a value dependent upon operating parameters of the engine, such as the engine rotational speed NE and the intake pipe absolute pressure PBA.

Then, the program proceeds to a step S6, wherein a second predetermined amount DLDKC is calculated by the use of the following equation (3):

$$DLDKC = LMAP \times KDLDKC1 \quad (3)$$

where KDLDKC1 represents a second predetermined coefficient, which is applied when the desired air-fuel ratio of the mixture has been changed from a lean state to a rich state and set to a predetermined value according to change timing of the desired air-fuel ratio from the lean state to the rich state. The second predetermined coefficient KDLDKC1 may be set to a fixed value, or to a value dependent upon operating parameters of the engine, such as the engine rotational speed NE and the intake pipe absolute pressure PBA, or to a value dependent upon the value of the first predetermined coefficient KLDKC1.

On the other hand, if the answer to the question at the step S4 is negative (NO), it is determined that the desired air-fuel ratio of the mixture has been changed from a rich state to a lean state, and then the program proceeds to a step S7, wherein the first predetermined amount LDKC is calculated by the use of the following equation (4):

$$LDKC = LMAP \times KLDKC2 \quad (4)$$

where KLDKC2 represents a first predetermined coefficient, which is applied when the desired air-fuel ratio of the mixture has been changed from a rich state to a lean state and set to such a predetermined value as compensate for the dynamic delay of exhaust gases to be recirculated when the desired air-fuel ratio of the mixture has been changed from the rich state to the lean state. The first predetermined coefficient KLDKC2 may be set to a fixed value, or to a value dependent upon operating parameters of the engine, such as the engine rotational speed NE and the intake pipe absolute pressure PBA.

Then, at a step S8, the second predetermined amount DLDKC is calculated by the use of the following equation (5):

$$DLDKC = LMAP \times KDLDKC2 \quad (5)$$

where KDLDKC2 represents a second predetermined coefficient, which is applied when the desired air-fuel ratio of the mixture has been changed from a rich state to a lean state and set to a predetermined value according to change timing of the desired air-fuel ratio from the rich state to the lean state. The second predetermined coefficient KDLDKC2 may have a different value from KLDKC1 and may be set to a fixed value, or to a value dependent upon operating parameters of the engine, such as the engine rotational speed NE and the intake pipe absolute pressure PBA, or to a value dependent upon the value of the first predetermined coefficient KLDKC2.

In the above described manner, at the steps S5 to S8 the first predetermined amount LDKC and the second predetermined amount DLDKC are calculated according to the changing direction of the desired air-fuel ratio. Then, the program proceeds to a step S9, wherein it is determined whether or not the second predetermined amount DLDKC calculated as above is smaller than a predetermined limit value DLDKCL. If the second predetermined amount DLDKC is larger than the predetermined limit value DLDKCL, the program jumps over to a step S11, whereas if the second predetermined amount DLDKC is smaller than the predetermined limit value DLDKCL, the second predetermined amount DLDKC is set to the predetermined limit value DLDKCL at a step S10, and then the program proceeds to the step S11.

At the step S11, the flag FEDKC is set to "1", which means that the desired air-fuel ratio has been changed from a rich state to a lean state or vice versa, and then the program proceeds to a step S12, wherein a KEAF/KCMDM table is retrieved to calculate a valve opening correction value KEAF.

Figure 3A:
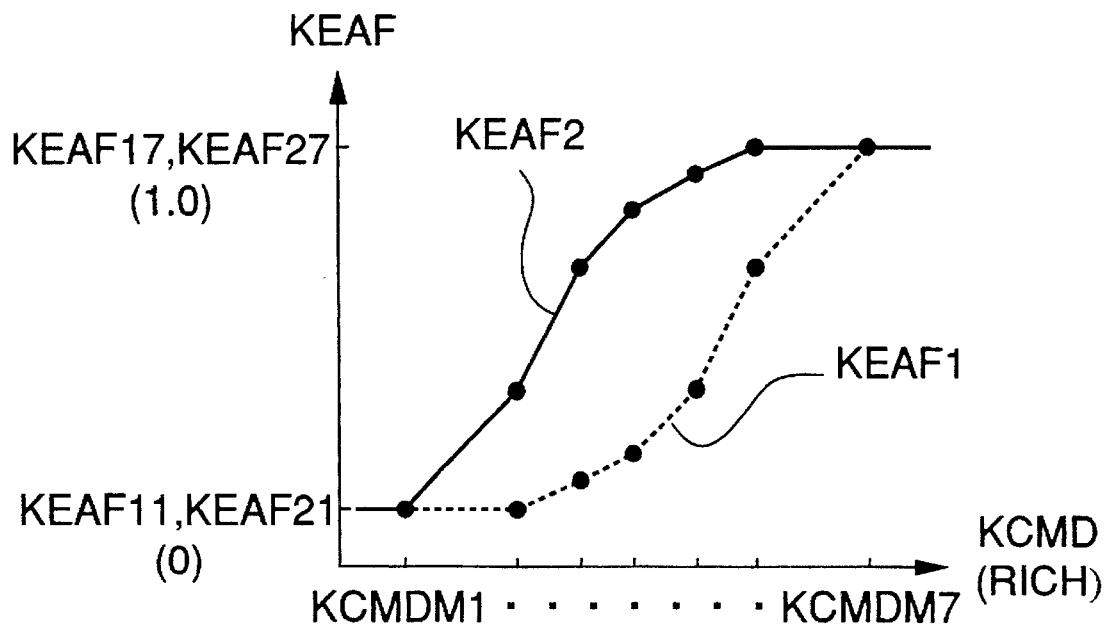
FIG. 3A shows a KEAF/KCMDM table for determining a valve opening correction value KEAF.
Figure 3B:
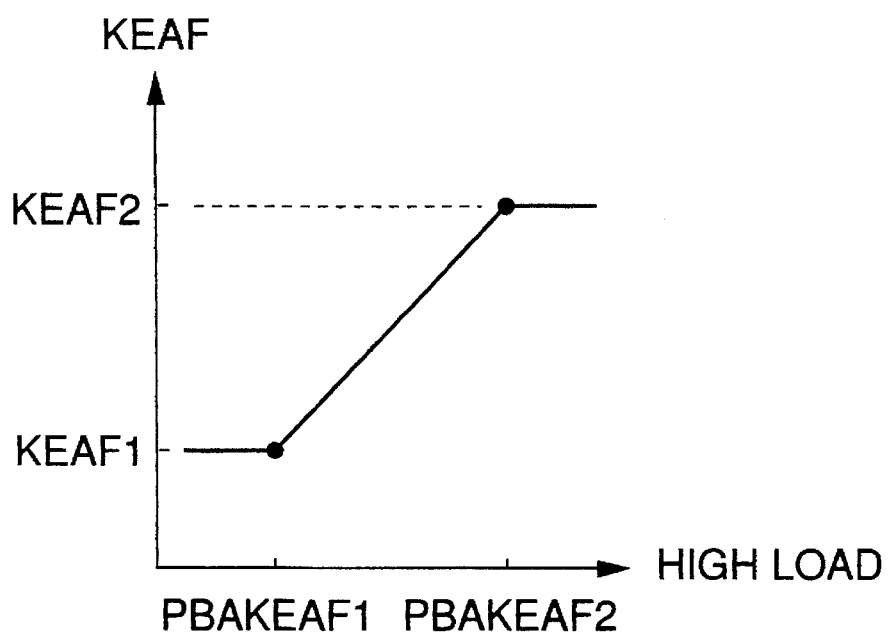
FIG. 3B shows a KEAF/PBA table which is used together with the KEAF/KCMDM table of FIG. 3A to determine the valve opening correction value KEAF.

As shown in FIG. 3A, the KEAF/KCMDM table sets a valve opening correction value KEAF1 (indicated by the broken line in FIG. 3A) employed when the intake pipe absolute pressure PBA is smaller than a predetermined value PBAKEAF1 (see FIG. 3B) and a valve opening correction value KEAF2 (indicated by the solid line in FIG. 3A) employed when the intake pipe absolute pressure PBA is larger than a predetermined value PBAKEAF2 (see FIG. 3B), wherein predetermined values KEAF11 and KEAF21 to KEAF17 and KEAF27 are allotted to modified desired air-fuel ratio coefficient values KCMDM1 to KCMDM7, respectively. First, by using the KEAF/KCMDM table of FIG. 3A, the KEAF1 and KEAF2 values are determined or read out in accordance with the KCMDM value, and by interpolation if the KCMDM value falls between adjacent ones of the predetermined values KCMDM1–KCMDM7. Then, by using a KEAF/PBA table in FIG. 3B, when PBA≧PBAKEAF2 or PBA≦PBAKEAF1 holds, the KEAF value is directly set to the KEAF1 value or the KEAF2 value determined as above, whereas when PBAKEAF1<PBA<PBAKEAF2 holds, the KEAF value is determined in accordance with the PBA value by interpolation. According to the tables of FIGS. 3A and 3B, the valve opening correction value KEAF can be set to a value within a range of 0 to 1.0, such that it is set to a smaller value as the modified desired air-fuel ratio coefficient KCMDM is smaller. This setting reflects the fact that the smaller the modified desired air-fuel ratio coefficient KCMDM, the smaller the fuel injection amount TOUT (see the expression (1)), and accordingly the valve opening correction value KEAF should be set to a smaller value with a decrease in the KCMDM value.

After the determination of the valve opening correction value KEAF, the program proceeds to a step S13, wherein a desired valve opening value LCMD is calculated by multiplying the basic valve opening value LMPAP by the valve opening correction value KEAF, and the the first predetermined amount LDKC calculated at the step S5 or S7 is added to the product LMAP×KEAF to calculate the modified desired valve opening value LCMDM, followed by terminating the present program.

Thus, immediately after the desired air-fuel ratio has been changed from a rich state to a lean state or vice versa, exhaust gas recirculation control is started based on the modified desired valve opening value LCMDM obtained by adding the first predetermined amount LDKC to the desired valve opening value LCMD, and hence a suitable exhaust gas recirculation amount can be obtained, which takes into account the dynamic delay of exhaust gases to be recirculated, immediately after the change in the desired air-fuel ratio, resulting in decreased emission of noxious components, such as NOx, immediately after the change in the desired air-fuel ratio.

On the other hand, since the flag FEDKC is set to "1" at the step S11 in the present loop of execution of the program, the answer to the question at the step S3 becomes affirmative (YES) in the next loop, so that the program proceeds to a step S14, wherein the first predetermined amount LDKC is decreased by subtracting the second predetermined amount DLDKC calculated at the step S6 or S8, or set at the step S10 from the first predetermined amount LDKC. Next, at a step S15 it is determined whether or not the first predetermined amount LDKC thus decreased is smaller than "0". If the answer to this question is negative (NO), the steps S12 and S13 are executed again to obtain an updated value of the modified desired valve opening value LCMDM, followed by terminating the program.

In this way, at the step S13, an updated value of the modified desired valve opening value LCMDM is calculated by subtracting the second predetermined coefficient DLDKC from the first predetermined coefficient LDKC obtained in the last loop, whereby the valve opening of the EGR valve 19 is duty controlled based on the updated or decreased value of the modified desired valve opening value LCMDM.

On the other hand, if the answer to the question at the step S15 is affirmative (YES), the first predetermined amount LDKC is set to "0" at a step S16, and then the steps S12 and S13 are executed to obtain an updated value of the modified desired valve opening value LCMDM, followed by terminating the program. That is, on this occasion, since LDKC=0 stands, the modified desired valve opening value LCMDM is equal to the desired valve opening value LCMD (=LMAP×KEAF), and then the valve opening of the EGR valve 19 is duty controlled based on the non-corrected desired valve opening value LCMD.

As described above, immediately after the change in the desired air-fuel ratio of the mixture from a rich state to a lean state or vice versa, the modified desired valve opening value LCMDM is calculated by adding the first coefficient LDKC to the desired valve opening value LCMD (=LMAP×KEAF), and the valve opening of the EGR valve 19 is duty controlled based on the thus increased modified desired valve opening value. Thereafter, the modified desired valve opening LCMDM is updated by adding to the desired valve opening value LCMD the first predetermined coefficient LDKC which is progressively decreased by the second predetermined coefficient DLDKC, and the valve opening of the EGR valve 19 is duty controlled based on the thus updated modified desired valve opening value LCMDM, until the modified desired valve opening value LCMDM becomes equal to the desired valve opening value LCMD, and thereafter, based upon the desired valve opening value LCM, exhaust gas recirculation control is finally carried out. By progressively decreasing the first predetermined amount LDKC by the second predetermined amount DLDKC, the exhaust gas recirculation control can be smoothly changed to one based upon the desired valve opening value LCMD.

FIGS. 4A and 4B show how the EGR valve 19 is controlled when the desired air-fuel ratio of the mixture has been changed from a rich state to a lean state.

FIG. 4A shows a change in the desired air-fuel ratio from a rich state to a lean state, and FIG. 4B shows a change in the modified desired valve opening value LCMDM of the EGR valve 19 which is caused by the change in shown in FIG. 4A. In FIG. 4B, the solid line shows a change in the KCMDM value obtained by applying the first and second predetermined coefficients LDKC, DLDKC according to the invention, and the broken line shows a change in the same obtained based on the desired valve opening value LCMD (=LMAP×KEAF) alone.

As is apparent from FIGS. 4A and 4B, immediately after the change in the desired air-fuel ratio of the mixture from the rich state to the lean state, the flow rate of exhaust gases to be recirculated is controlled based on the modified desired valve opening value LCMDM obtained by adding the first predetermined amount LDKC to the desired valve opening value LCMD. Thereafter, the second predetermined amount DLDKC is successively subtracted from the first predetermined amount LDKC, until the first predetermined amount LDKC becomes equal to zero, whereupon exhaust gas recirculation control is switched to one based on the desired valve opening value LCMD. Thus, immediately after the change in the desired air-fuel ratio from a rich state to a lean state, exhaust gas recirculation control is started by the use of the modified desired air-fuel ratio coefficient LCMDM obtained by adding the first predetermined amount LDKC to the desired valve opening value LCMD. As a result, immediately after the change in the desired air-fuel ratio from the rich state to the lean state, the amount of exhaust gases to be recirculated is increased to a value which can compensate for the dynamic delay of exhaust gases to be recirculated, to thereby restrain emission of noxious components, such as NOx, immediately after the change in the desired air-fuel ratio from the rich state to the lean state.

FIGS. 5A and 5B show how the EGR valve 19 is controlled when the desired air-fuel ratio of the mixture has been changed from a lean state to a rich state.

FIG. 5A shows a change in the desired air-fuel ratio from a lean state to a rich state, and FIG. 5B shows a change in the modified desired valve opening value LCMDM of the EGR valve 19 which is caused by the change in the desired air-fuel ratio. In FIG. 5B, the solid line shows a change in the KCMDM value obtained by applying the first and second predetermined coefficients LDKC, DLDKC according to the invention, and the broken line shows a change in the same obtained based on the desired valve opening value LCMD (=LMAP×KEAF) alone.

As is apparent from FIGS. 5A and 5B, immediately after the change in the desired air-fuel ratio of the mixture from a lean state to a rich state, the flow rate of exhaust gases to be recirculated is controlled based on the modified desired valve opening value LCMDM obtained by adding the first predetermined amount LDKC to the desired valve opening value LCMD. Thereafter, the second predetermined amount DLDKC is successively subtracted from the first predetermined amount LDKC, until the first predetermined amount LDKC becomes equal to zero, whereupon exhaust gas recirculation control is switched to one based on the desired valve opening value LCMD. Thus, immediately after the change in the desired air-fuel ratio from a lean state to a rich state, exhaust gas recirculation amount control is started by the use of the modified desired air-fuel ratio coefficient LCMDM obtained by adding the first predetermined amount LDKC to the desired valve opening value LCMD. As a result, like the case where the desired air-fuel ratio is changed from a rich state to a lean state, immediately after the change of the desired air-fuel ratio from the lean state to the rich state, the amount of exhaust gases to be recirculated is increased to a value which compensates for the dynamic delay of exhaust gases to be recirculated, to thereby restrain emission of noxious components, such as NOx, immediately after the change of the desired air-fuel ratio from the lean state to the rich state.

What is claimed is:

1. In an exhaust gas recirculation control system for an internal combustion engine having an intake system, and an exhaust system, including an exhaust gas recirculation passage extending between said intake system and said exhaust system, for recirculating part of exhaust gases emitted from said engine, an exhaust gas recirculation control valve for controlling a flow rate of exhaust gases to be recirculated through said exhaust gas recirculation passage, engine operating condition-detecting means for detecting operating conditions including rotational speed of said engine and load on said engine, desired air-fuel ratio-calculating means for calculating a desired air-fuel ratio of a mixture supplied to said engine, based on operating conditions of said engine detected by said operating condition-detecting means, and desired valve opening-calculating means for calculating a desired valve opening of said exhaust gas recirculation control valve, based on operating conditions of said engine detected by said operating condition-detecting means and said desired air-fuel ratio calculated by said desired air-fuel ratio-calculating means, the improvement comprising:

determining means for determining whether said desired air-fuel ratio has been changed from a lean state to a rich state or vice versa, based on said desired air-fuel ratio calculated by said desired air-fuel ratio-calculating means;

valve opening-modifying means for modifying said desired valve opening of said exhaust gas recirculation control valve calculated by said desired valve opening-calculating means, by a first predetermined amount; and valve opening control means for starting said controlling of said flow rate of exhaust gases to be recirculated by said exhaust gas recirculation control valve, by the use of said modified desired valve opening, when it is determined by said determining means that said desired air-fuel ratio of said mixture has been changed from said lean state to said rich state or vice versa.

2. An exhaust gas recirculation control system as claimed in claim 1, wherein said desired valve opening-calculating means comprises basic valve opening-calculating means for calculating a basic value of said desired valve opening, based on operating conditions of said engine detected by said operating condition-detecting means, and correction means for correcting said basic value of said desired valve opening calculated by said basic valve opening-calculating means, based on operating conditions of said engine detected by said operating condition-detecting means and said desired air-fuel ratio of said mixture calculated by said desired air-fuel ratio calculating means, said valve opening-modifying means calculating said first predetermined amount by multiplying said basic value of said desired valve opening by a first predetermined coefficient.

3. An exhaust gas recirculation control system as claimed in claim 2, wherein said first predetermined coefficient is set to a first value when it is determined by said determining means that said desired air-fuel ratio of said mixture has been changed from said lean state to said rich state, and to a second value when it is determined by said determining means that said desired air-fuel ratio of said mixture has been changed from said rich state to said lean state.

4. An exhaust gas recirculation control system as claimed in claim 1, wherein said valve opening-modifying means includes adding means for adding said first predetermined amount to said desired valve opening to modify said desired valve opening, and subtracting means for successively subtracting a second predetermined amount from said first predetermined amount.

5. An exhaust gas recirculation control system as claimed in claim 4, wherein said desired valve opening-calculating means comprises basic valve opening-calculating means for calculating a basic value of said desired valve opening, based on operating conditions of said engine detected by said operating condition-detecting means, and correction means for correcting said basic value of said desired valve opening calculated by said basic valve opening-calculating means, based on operating conditions of said engine detected by said operating condition-detecting means and said desired air-fuel ratio of said mixture calculated by said desired air-fuel ratio calculating means, said valve opening-modifying means calculating said second predetermined amount by multiplying said basic value of said desired valve opening by a second predetermined coefficient.

6. An exhaust gas recirculation control system as claimed in claim 5, wherein said second predetermined coefficient is set to a first value when it is determined by said determining means that said desired air-fuel ratio of said mixture has been changed from said lean state to said rich state, and to a second value when it is determined by said determining means that said desired air-fuel ratio of said mixture has been changed from said rich state to said lean state.

7. An exhaust gas recirculation control system as claimed in claim 1, wherein said valve opening-modifying means modifies said desired valve opening in an increasing direction by said first predetermined amount.

* * * * *